No. 630,763. Patented Aug. 8, 1899.
F. J. WOOD.
GOVERNOR FOR BAND CUTTERS AND FEEDERS FOR THRESHING MACHINES.
(Application filed Mar. 15, 1899.)
(No Model.)
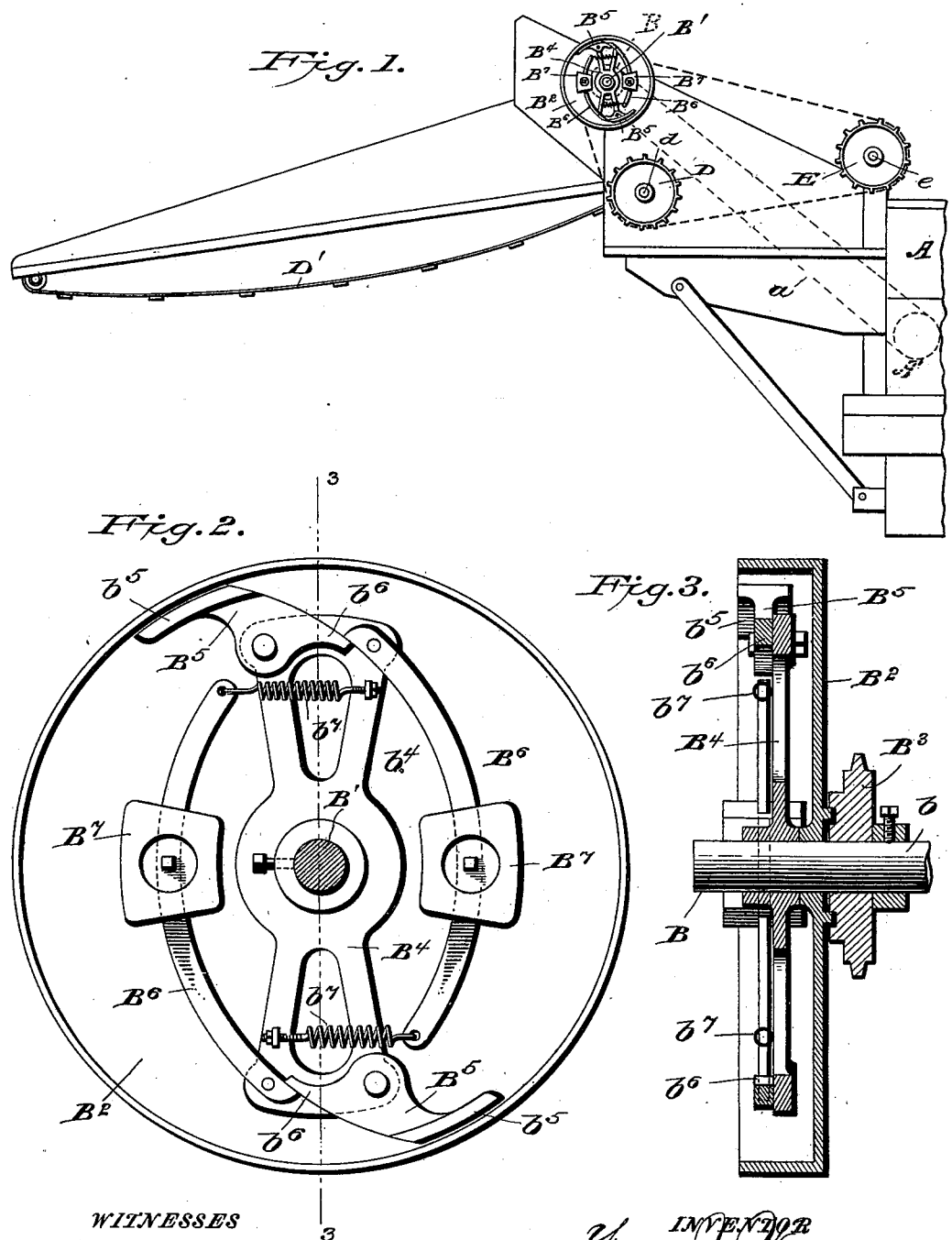

United States Patent Office.

FRANZ J. WOOD, OF PIPE STONE, MINNESOTA.

GOVERNOR FOR BAND-CUTTERS AND FEEDERS FOR THRESHING-MACHINES.

SPECIFICATION forming part of Letters Patent No. 630,763, dated August 8, 1899.

Application filed March 15, 1899. Serial No. 709,187. (No model.)

*To all whom it may concern:*

Be it known that I, FRANZ J. WOOD, a citizen of the United States, residing at Pipe Stone, in the county of Pipe Stone and State of Minnesota, have invented new and useful Improvements in Governors for Band-Cutters and Feeders for Threshing-Machines, of which the following is a specification.

This invention relates to certain new and useful improvements in governors or speed-regulators for band-cutters and feeders for threshing-machines.

The object of the invention is to provide a governor or speed-regulator for band-cutters and feeders which will be effective in operation and simple in construction, the same being mounted on the shaft carrying the band-cutter, which shaft is driven from the threshing-cylinder, so that when the rotation of said cylinder is reduced below the speed required for effective work the clutches of the governor will be disengaged from the disk or wheel with which they contact and allow said disk to remain idle on the shaft which carries the band-knife to effect a stoppage of the carrier-belt and feeding-forks until the threshing-cylinder resumes its normal rate of speed.

In carrying out my invention I prefer to apply my present improvements to the band-cutter and feeder shown in my Patent No. 496,764, dated May 2, 1893, and No. 604,281, dated May 17, 1898.

In the accompanying drawings, which illustrate my invention, Figure 1 is a side elevation showing my improvement applied to a band-cutter and feeder and threshing-machine. Fig. 2 is a side view of the governor, and Fig. 3 is a vertical sectional view taken through the line 3 3.

A refers to a threshing-machine to which the band-cutter and feeder is attached, the band-cutter and feeder having an endless carrier, upon which the sheaves or bundles are placed, a rotary band-cutter mounted on a shaft which is driven directly from the threshing-cylinder of the threshing-machine, agitating-fingers for separating the bundles after the bands have been cut, and forks in front of the threshing-cylinder for feeding the straw thereto. The threshing-cylinder A' is driven in the usual manner by a belt on one end of the shaft of the cylinder, and on the shaft is a pulley over which passes a belt $a$, which also passes over a pulley B, mounted on the shaft B', which carries the knives of the band-cutter, so that the band-knife shaft will be driven direct from the threshing-cylinder. The band-knife shaft B' has mounted loosely thereon a disk $B^2$, with a projecting rim, and adjacent to its hub projections which engage with the face of a sprocket-wheel $B^3$, also loosely mounted on the shaft B', the projections providing means for connecting the disk $B^2$ and sprocket-wheel $B^3$ to each other, the projections entering recesses in the sprocket-wheel. The shaft B' carries a collar $b$, which is clamped thereon and abuts against one of the sides of the sprocket-wheel $B^3$. A chain C passes over the sprocket-wheel $B^3$ and drives therefrom sprocket-wheels D E, which are rigidly attached to shafts $d$ $e$, the shaft $d$ having a drum over which passes the endless carrier D', the shaft $e$ operating the feeding-forks in advance of the threshing-cylinder A'.

The oscillating separating-fingers and reciprocating feed-board of the band-cutter and feeder may be actuated as shown in my prior patents hereinbefore mentioned or in substantially the manner shown therein.

Upon the shaft B' is rigidly mounted a frame $B^4$, the hub thereof carrying a bolt for connecting the frame to the shaft, and this frame has pivoted to opposite ends of the same clutches $B^5$, constructed to present faces or shoes $b^5$, which engage with the inner surface of the rim of the disk $B^2$, and on the opposite side of the pivots supporting the clutches are projecting portions $b^6$, which engage the short ends of levers $B^6$, fulcrumed upon opposite ends of the frame $B^4$. The ends of the levers $B^6$ farthest from their fulcrums or points of pivotal connection with the frame are connected thereto by springs $b^7$, and upon the levers are mounted weights $B^7$, which are adjustably secured thereto. The springs $b^7$, which connect the long ends of the lever to the frame, are of such strength that they will hold the short ends of the curved arms or levers $B^6$ out of engagement with the pivoted shoes or clutches by drawing the long ends of the levers toward the arms of the frame, so that the shaft B' can be rotated at a low rate of speed without causing the clutches to engage the rim of the disk; but as soon as the shaft acquires the desired rate of speed centrifugal force will move the long end of the weighted levers outward, causing the short ends thereof to engage the inner ends of the clutches, so as to force the shoes thereof in engagement with the rim of the disk, so that the disk and sprocket-wheel connected thereto will be turned with the shaft. The weights $B^7$ on the levers can be adjusted or set so as to determine the rate of speed at which the clutches will engage the rim.

It will be noted that the clutches or shoes of the governor are fulcrumed upon the frame which carries the levers, so that a double leverage is effected which is powerful in action, and, if desirable, the weights or the springs may be so adjusted that one of the clutches will engage with the rim before the other, so that the starting of the carrier-belt and feeding-forks will be gradual. The construction is such that the governor acts direct from the band-knife shaft and in connection with the carrier and feeding-forks. Hence if the cylinder winds in long or damp straw and checks the motion the carrier and feeding-forks stop until the cylinder returns to its normal speed, when the carrier and feeding-forks will again commence to operate. Another special feature is that if three or four bundles are pitched into the knives at once they have a tendency to clog them and throw the belt. The governor then acts quickly in stopping the carrier and feeding-forks, relieving the driving-belt of a part of its load, and allowing the full power or strain to come on the knives, which will work a part of the grain through and allow the knives to get back to speed, when the governor again acts and operates the carrier and feeding-forks.

In practice it is desirable that the governor should be set so that when a slat of the carrier is held the carrier will slip or be stopped and the clutches will slide on the rim. When the governor is so set, there is never any danger of breaking a slat of the carrier by getting a fork caught in it, as frequently occurs.

In threshing it is essential that the speed of the carrier and feeder-forks be gaged to suit the condition of the straw, and with this end in view the governor is so constructed that it may readily be removed from the band-knife shaft by loosening the set-screw and slipping the frame, disk, and sprocket from the shaft, and then applying a sprocket of the desired size, several sprockets being provided, the smaller ones for a slow speed or feed and the larger sprockets for a fast feed.

Belts and pulleys may be substituted for the chains and sprockets without departing from my invention, as I consider one the equivalent of the other, sprockets and chains, however, being preferable in this class of machinery.

I am aware that prior to my invention it has been proposed to provide a band-cutter and feeder with an automatic governor to effect a stoppage of the feeding mechanism when the speed of the threshing-cylinder is reduced, and I do not claim such invention broadly; but What I do claim is—

A governor and driving-gear for the feeding and band-cutting mechanism of threshing-machines, consisting of a frame $B^4$ non-rotatively and removably connected to a shaft, inwardly-curved arms or levers $B^6$ pivotally attached to the outer ends of said frames and on opposite sides thereof, weights $B^7$ adjustably mounted on the arms or levers between the fulcrums thereof and their long ends, springs connected to the long ends of the arms or levers and adjustably connected to the frame, clutches pivoted to the frames so that one of the ends thereof will be engaged by the short ends of the levers when the long ends of said levers are moved away from the frame, a disk having a flange which overlies the clutches, said disk being rotatively mounted on the shaft, a driving-sprocket $B^3$ also rotatively mounted on the shaft, the disk and sprocket having interlocking faces, and a collar or stop $b$ on the shaft with which the sprocket-wheel engages, the hub of the frame $B^4$ bearing against the plain face of the hub of the disk to hold the projections thereon in engagement with the recesses in the sprocket-wheel, substantially as shown and for the purpose set forth.

In testimony whereof I have hereunto set my hand in presence of two subscribing witnesses.

FRANZ J. WOOD.

Witnesses:
J. J. PRINCE,
R. S. WOOD.